United States Patent [19]

Lassander et al.

[11] Patent Number: 5,719,897
[45] Date of Patent: Feb. 17, 1998

[54] FURNACE VESSEL FOR A DIRECT CURRENT ARC FURNACE

[75] Inventors: Erik Alfred Lassander, Viken, Sweden; Sven-Einar Stenkvist, Brugg, Switzerland

[73] Assignee: Asea Brown Boveri AG, Baden, Switzerland

[21] Appl. No.: 515,428

[22] Filed: Aug. 15, 1995

[30] Foreign Application Priority Data

Sep. 2, 1994 [DE] Germany .................. 44 31 293.8

[51] Int. Cl.⁶ .................................................. F27D 1/12
[52] U.S. Cl. ........................... 373/76; 373/72; 373/74
[58] Field of Search ............................. 373/71, 72, 73, 373/74, 75, 76

[56] References Cited

U.S. PATENT DOCUMENTS

| | | | |
|---|---|---|---|
| 2,166,964 | 7/1939 | Moore | 122/6 |
| 3,940,552 | 2/1976 | Mizuno | 13/35 |
| 4,434,495 | 2/1984 | Tomizawa et al. | 373/76 |

FOREIGN PATENT DOCUMENTS

| | | |
|---|---|---|
| 10286 | 4/1980 | European Pat. Off. . |
| 24548 | 3/1981 | European Pat. Off. . |
| 116696 | 8/1984 | European Pat. Off. . |
| 216187 | 4/1987 | European Pat. Off. . |
| 0 578 596 | 1/1994 | European Pat. Off. . |
| 2169649 | 9/1973 | France . |
| 1027704 | of 0000 | Germany . |
| 2745622 | 8/1979 | Germany . |
| 29 28 964 | 1/1981 | Germany . |
| 3048025 C2 | 9/1983 | Germany . |
| 27 59 713 | 10/1983 | Germany . |
| 1063018 | 3/1967 | United Kingdom . |

*Primary Examiner*—Tu B. Hoang
*Attorney, Agent, or Firm*—Oblon, Spivak, McClelland, Maier & Neustadt, P.C.

[57] ABSTRACT

In order to reduce the power loss of a direct current arc furnace the furnace vessel is only partially cooled in the region situated above the melting zone. A first cooling device is provided on a top edge of the vessel. A second cooling device is provided at the height of a slag line. The region of a vessel wall situated therebetween and facing the interior of the vessel above the slag line consists essentially of refractory material.

9 Claims, 1 Drawing Sheet

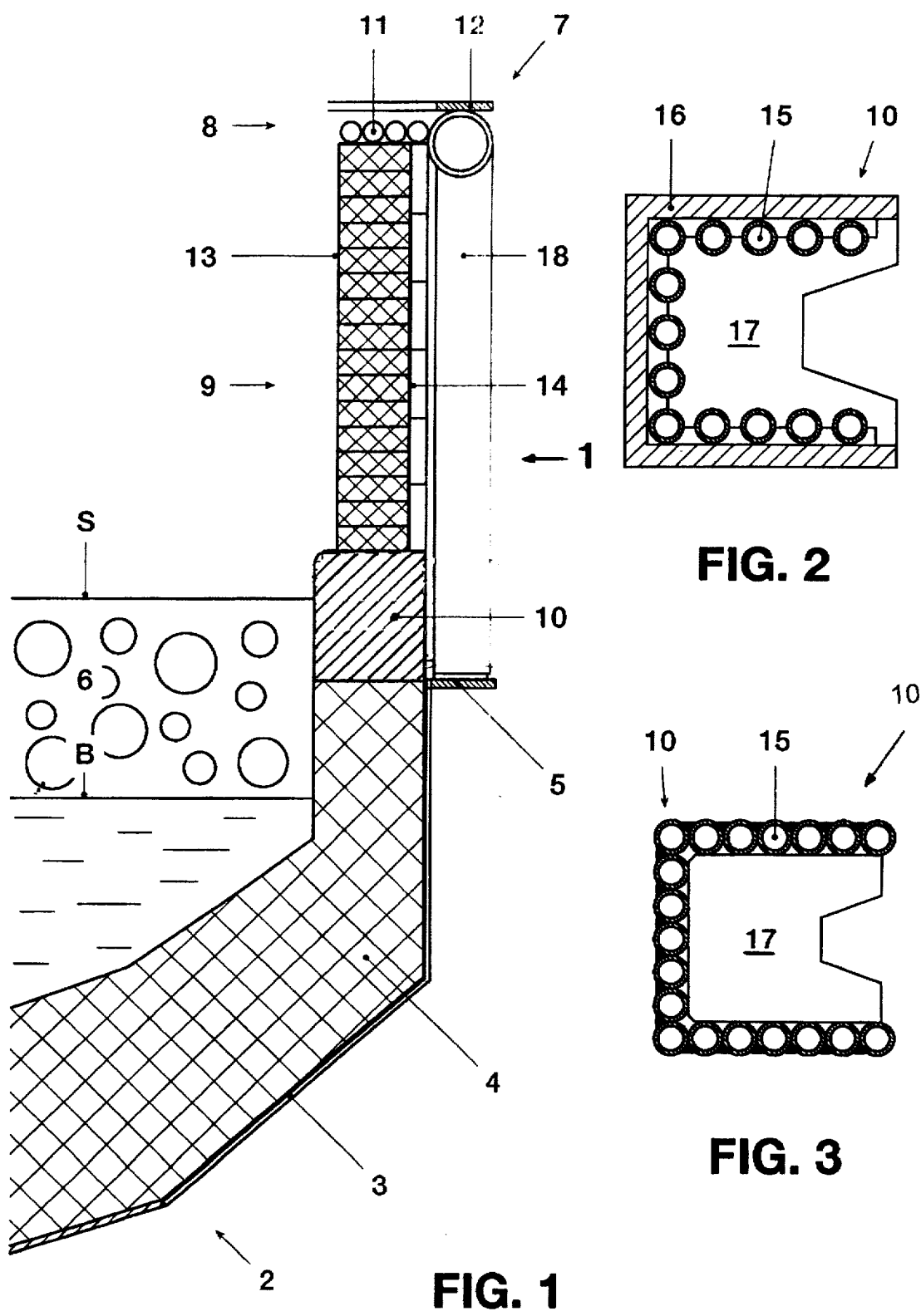

FURNACE VESSEL FOR A DIRECT CURRENT ARC FURNACE

BACKGROUND OF THE INVENTION

1. Field of the Invention

The invention relates to a furnace vessel for a direct current arc furnace having a heat-resistant wall provided partially with a cooling device in the region situated above the melting zone.

2. Discussion of Background

Metal melting furnaces are normally in the form of steel structures. As protection against the high temperatures in the vessel and also on the cover, linings of refractory material are provided. The lining protects the steel structure against thermal, chemical and mechanical stresses. Heavy stressing has the consequence that the refractory lining has only a limited life. In accordance with this life, production has to be regularly interrupted in order to install a new lining. Relining in this way leads to reduced production and in addition constitutes a substantial component of operating costs.

In order to protect the stressed parts against the effects of heat, use is made of cooling devices, particularly cooling tubes, which are built into or onto the brickwork. In such cases, however, it cannot be avoided that parts of the refractory lining unavoidably flake off or crumble away, because of the heavy stressing, after a number of charges. For this reason, it became the practice a few years ago to develop water-cooled wall and cover linings able to replace the refractory lining outside the melting region.

From DE-27 45 622 C2 a vessel of this kind for a metal melting furnace is known. The region of the vessel wall situated above the melting zone comprises cooling blocks of at least one cooling tube coil which substantially lies free on both sides, said cooling blocks being fastened on a supporting wall in the form of a sheet metal shell or a skeleton. A disadvantage in this case is that a considerable proportion of the power lost in the furnace is dissipated by the cooling water circulating in the tube coils. Thus, in the case of a 150-tonne furnace the losses through the water-cooled wall can amount to many megawatts.

SUMMARY OF THE INVENTION

Accordingly, one object of the invention is to provide a novel vessel for a direct current arc furnace which withstands all operational stressing and nevertheless is distinguished by comparatively low heat losses.

According to the invention this object is achieved in that a first cooling device is provided on the top edge of the vessel, a second cooling device is provided at the height of the slag line, and the region of the vessel wall situated therebetween and facing the interior of the vessel above the slag line consists essentially of refractory material.

The invention is to this end based on the following realizations:

Arcs in an alternating current furnace are diverted obliquely outwards by the magnetic field acting in the electrode region. The charge material, usually scrap, thus melts away prematurely between the electrode and the wall of the vessel, so that the wall is subjected to the full power of the arcs. In the case of alternating current furnaces cooling measures, for example in accordance with DE-27 45 622 C2 cited above, are consequently unavoidable. The direct current arc furnace, on the other hand, permits a centrally disposed, vertically burning arc. The specific thermal load is thus considerably reduced. It is then sufficient to apply targeted cooling solely to the particularly stressed zones in the region above the melt, namely the top edge of the vessel and the region of the slag line. Below the cooled edge of the vessel the vessel wall has a ceramic lining as far as the slag line, with a typical thickness of 300 mm. This lining may for example be constructed of bricks, for example magnesite or magnesite-graphite bricks, or of rammed and sprayed monolithic refractory material. Underneath this ceramic wall part a more intensely water-cooled region follows again at the slag edge at the height of the slag line.

The advantage of the invention is to be seen in particular in the fact that in this way the wall losses can be reduced to approximately 5 to 10 kW per square meter of wall surface, which, viewed overall, leads to a reduction of power loss by approximately 50%.

An exemplary embodiment of the invention and the advantages achieved therewith are explained in greater detail below with reference to the drawings.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 1 shows a part of the simplified longitudinal section through the furnace vessel of a direct current arc furnace having a vessel wall only cooled in sections by liquid;

FIG. 2 shows a part of FIG. 1 with a second cooling device provided with cooling tubes arranged on the inside of a U-shaped girder; and FIG. 3 shows an alternative configuration of the second cooling device having cooling tubes disposed close against one another.

DESCRIPTION OF THE PREFERRED EMBODIMENTS

Referring now to the drawings, wherein like reference numerals designate identical or corresponding parts throughout the several views, in FIG. 1, which shows a partial section through the furnace vessel of a direct current arc furnace, the furnace vessel comprises an upper vessel part 1 and a bottom part 2. The bottom part 2 is constructed in the usual manner. The bottom lining 4 rests on a shell 3 of sheet steel. The shell ends in a collar 5. The bath level occurring in operation is denoted by B. The bath level B lies distinctly below the collar 5. The slag layer 6 formed in the operation of the furnace extends to the slag line S.

The upper vessel part 1 rests both on the bottom lining 4 and on the collar 5. Viewed from top to bottom from the vessel edge 7, it comprises essentially three sections: directly adjoining the vessel edge 7 a first cooling device 8, a ceramic wall part 9 and a second cooling device 10 at the height of the slag line S.

The first cooling device 8 comprises a water-cooled ring or ring segments, formed by juxtaposed cooling tubes 11 covered by a supporting ring 12.

In the case of the example the ceramic wall part 9 comprises magnesite or magnesite-graphite bricks 13, typically having a thickness of 300 mm. It may however also consist of sprayed or rammed monolithic refractory material. On the outside a supporting wall 14 is provided, which consists of sheet steel on which reinforcing ribs are welded. This supporting wall 14 may optionally be a double wall, and cooling water may flow through it.

Under this ceramic wall part 9 there follows again, at the slag edge, a more intensely water-cooled region with the second cooling device 10. The latter, as shown in FIG. 2, essentially comprises cooling tubes 15, which are welded (in the case of steel tubes) or soldered (in the case of copper tubes) to the inside of a channel section girder 16. Supporting metal sheets 17 increase the mechanical stability of the girder 16.

As an alternative, as shown in FIG. 3 the cooling tubes 15 may also be disposed close against one another without using a girder and be tightly welded or soldered to each other. Here too supporting metal sheets 17 provide reinforcement.

In addition to the cooling function, the second cooling device 10 also forms at the same time the supporting structure for the ceramic wall part 9 and (of course) also for the cover (not shown) of the furnace vessel.

The upper vessel part 1 is preferably divided into sections or segments in order to simplify the replacement of wall parts which have become defective. The individual sections or segments are supported by a cage structure known per se, of which only a vertically extending cage element 18 can be seen in FIG. 1.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vessel for a direct current arc furnace having a heat-resistant wall provided partially with a cooling device in a region situated above a melting zone, wherein the cooling device comprises a first cooling device provided on a top edge of the vessel, and a second cooling device provided at a height of a slag line of a slag layer formed in the furnace; and a vessel wall of the vessel comprises a section which is located between the first and second cooling devices, said section of the vessel wall facing an interior of the vessel above the slag line and consisting essentially of refractory material, said second cooling device forming a supporting structure for the refractory material.

2. The vessel as claimed in claim 1, wherein the first cooling device is in the form of a closed ring, or a ring divided into segments, of cooling tubes.

3. The vessel as claimed in claim 1, wherein the second cooling device is in the form of a closed ring or a ring divided into segments and comprises cooling tubes which are arranged on a girder.

4. The vessel as claimed in claim 1, wherein said second cooling device is in the form of a closed ring or a ring divided into segments and comprises cooling tubes which are arranged close against one another and are tightly joined to each other.

5. The vessel as claimed in claim 1, wherein the refractory material consists of bricks or of rammed or sprayed monolithic material, which are or is supported on a supporting wall.

6. The vessel as claimed in claim 5, wherein the supporting wall is a double wall.

7. The vessel as claimed in claim 2, wherein the second cooling device is in the form of a closed ring or a ring divided into segments and comprises cooling tubes which are arranged on a girder.

8. The vessel as claimed in claim 2, wherein said second cooling device is in the form of a closed ring or a ring divided into segments and comprises cooling tubes which are arranged close against one another and are tightly joined to each other.

9. A vessel for a direct current arc furnace comprising:
a first cooling device provided on a top edge of the vessel; and
a second cooling device provided at a level of a slag line of a slag layer formed in the furnace;
wherein a vessel wall of the vessel comprises a ceramic wall part which faces an interior of the vessel and comprises refractory material, said ceramic wall part being positioned between said first and second cooling devices.

* * * * *